United States Patent
Shang et al.

(10) Patent No.: US 9,047,354 B2
(45) Date of Patent: Jun. 2, 2015

(54) STATEMENT CATEGORIZATION AND NORMALIZATION

(75) Inventors: Heping Shang, Walnut Creek, CA (US); Andrzej Sarapuk, Argenteuil (FR); Elena Isabel Lora-Gallardo, Montrouge (FR)

(73) Assignee: Sybase, Inc., Dublin, CA (US)

( * ) Notice: Subject to any disclaimer, the term of this patent is extended or adjusted under 35 U.S.C. 154(b) by 840 days.

(21) Appl. No.: 12/183,794

(22) Filed: Jul. 31, 2008

(65) Prior Publication Data

US 2010/0030817 A1   Feb. 4, 2010

(51) Int. Cl.
*G06F 17/30* (2006.01)

(52) U.S. Cl.
CPC .................. *G06F 17/30575* (2013.01)

(58) Field of Classification Search
USPC .................. 707/713, 714, 715, 634
See application file for complete search history.

(56) References Cited

U.S. PATENT DOCUMENTS

| | | | | |
|---|---|---|---|---|
| 5,940,825 A * | 8/1999 | Castelli et al. ........................ 1/1 |
| 7,461,039 B1 * | 12/2008 | Gilman ............................ 706/25 |
| 2003/0069880 A1 * | 4/2003 | Harrison et al. ................... 707/3 |
| 2005/0203940 A1 * | 9/2005 | Farrar et al. ..................... 707/102 |
| 2005/0278346 A1 * | 12/2005 | Shang et al. ..................... 707/100 |
| 2006/0259468 A1 * | 11/2006 | Brooks et al. ....................... 707/3 |
| 2007/0055712 A1 * | 3/2007 | Wolfgang et al. ............ 707/204 |
| 2007/0067726 A1 * | 3/2007 | Flynt et al. ..................... 715/733 |
| 2007/0214131 A1 * | 9/2007 | Cucerzan et al. ................. 707/5 |
| 2007/0250492 A1 * | 10/2007 | Angel et al. ..................... 707/4 |
| 2008/0052271 A1 * | 2/2008 | Lam ................................... 707/3 |
| 2008/0140696 A1 * | 6/2008 | Mathuria ..................... 707/102 |
| 2009/0119285 A1 * | 5/2009 | Sundaresan et al. ............ 707/5 |
| 2009/0327252 A1 * | 12/2009 | Zhang et al. ..................... 707/4 |

* cited by examiner

*Primary Examiner* — Jacob F Bétit
*Assistant Examiner* — Kris Andersen

(57) ABSTRACT

Systems, methods and computer program products for statement categorization and normalization are described herein. An embodiment includes a statement categorizer and a statement normalizer. The statement categorizer categorizes statements to reduce or even eliminate inconsistencies that may arise between primary and replicate databases as a result of executing certain statements. Categorized statements are normalized by the statement normalizer to generate normalized statements, which are provided to a replication server. Normalized statements assist replication server to regenerate a statement to be executed on a replicate database.

19 Claims, 7 Drawing Sheets

STATEMENT CATEGORIZATION AND NORMALIZATION

CROSS-REFERENCE TO RELATED APPLICATIONS

The present application is related to U.S. patent application Ser. No. 12/183,843, filed Jul. 31, 2008, and U.S. patent application Ser. No. 12/183,505, filed Jul. 31, 2008, both of which are incorporated herein by reference in their entireties.

BACKGROUND

1. Field of the Invention

The present invention relates to databases, and more particularly to database replication technology.

2. Background Art

Data replication is the process of maintaining up-to-date and multiple copies of a database object in a distributed database system. Performance improvements, and in some cases higher security of data can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively are online in a distributed system if a failure occurs.

Different solutions exist to obtain data from a source of modifications, for example a primary database, and provide the data to a replicate or target database. In some cases, data may be replicated at a different intervals by obtaining a "snap-shot" of a source of data or a "snap-shot" of modifications to source data that is to be replicated. replicate databases and the replicate or target database is updated only after a source at the primary database has been modified. Therefore, replication on the target database will occur after a delay of time, known as latency. An asynchronous replication solution can use different methods to transfer replication information. These methods include log based replication and statement based replication.

Log based replication involves storing a result of a data manipulation language (DML) statement into a transaction log. A process may then read the transaction log to extract and send information associated with the result to a replicate or target database. Statement replication includes transferring a data modification language statement itself to a replicate or target database in a way that data between a primary database and the replicate database continues to be in synchronization.

The results of a statement executed in the source database and replicate databases can be different depending on a replication architecture. For example, if data on a replicate database is a subset of data on the primary database, the same statement may affect a different set of data when it is replicated from the primary database to the replicate database. In such cases, SQL DML replication will result in data at the primary and the replicate database being out of synchronization.

Therefore, what is needed is a system, method and computer program product that replicates SQL DML statements in a manner that allows consistency between data in a primary database, and one or more replicate databases and overcomes performance issues are associated with result (row change) based replication.

BRIEF SUMMARY

Briefly stated, the invention includes system, method, computer program product embodiments and combinations and sub-combinations thereof for enabling SQL DML statement categorization and normalization. Although the present invention is described in terms of SQL DML statements, it is to be appreciated that other database statements may be used. An embodiment includes a database engine, a replication agent and a replication server which replicates data from a database engine to one or more replicate databases. The database engine further includes a statement categorizer, statement normalizer and a transaction log. The statement categorizer categorizes a statement based on a plurality of criteria. The statement normalizer normalizes a statement in a manner that allows replication server to regenerate the statement to be executed on one or more replicate databases. When a table in database engine is marked for replication, transactions that change the data in that table are captured for replication. Database engine processes each transaction, and a copy of each transaction (including all its operations) is stored in the transaction log.

In this way, statements, such as SQL DML statements, are normalized and categorized allowing them to be replicated in a manner that allows for consistency between data in primary and replicate databases.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
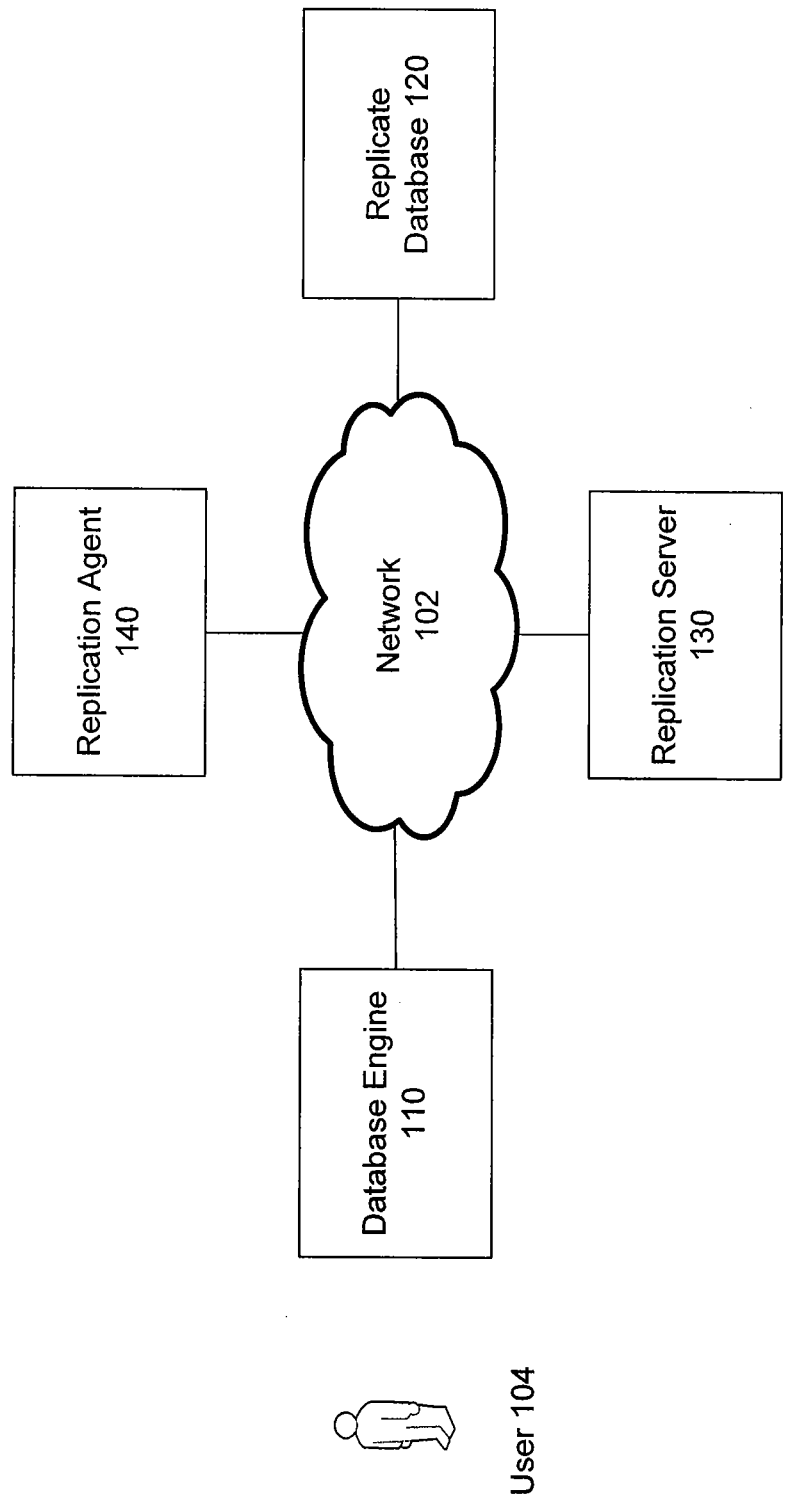
FIG. 1 is an architecture diagram of an exemplary replication environment, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods and computer program products for statement categorization and normalization.

An embodiment includes a database engine, a replication agent and a replication server which replicate data from primary database(s) to one or more replicate databases. The database engine further includes a statement categorizer and a statement normalizer. The statement categorizer categorizes a statement based on a plurality of criteria. The statement normalizer normalizes statements in a manner that allows the replication server to regenerate the statement to be executed on a replicate database.

In this way, statements, such as but not limited to SQL statements, are normalized and categorized (other types of statements applicable to the present invention will be apparent to persons skilled in the relevant arts).

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of embodiments of the present invention is organized into several sections as shown by the following table of contents.
Table of Contents
1. System
2. Statement Categorization
   2.1 Statement Category C3
   2.2 Statement Category C1
   2.3 Statement Category C2
3. Statement Normalization
4. Exemplary Normalization Methods
   4.1 Normalization by Removal of References to a Database Name
   4.2 Normalization by Appending Table Owner Information
   4.3 Normalization by Evaluating Variables and Parameters to Constants
   4.4 Normalization by Converting Expressions to Results
   4.5 Normalization by Substituting Default Values
5. Example Computer Embodiment
6. Conclusion
1. System This section describes a general system architecture for statement categorization and normalization, according to an embodiment of the invention as illustrated in FIG. 1.

FIG. 1 illustrates system 100 which includes database engine 110, replication agent 140, replication server 130 and replicate database 120. (While the following is described in terms of structured query language (SQL), the invention is not limited to this embodiment and other query languages may be used. The invention is applicable to any system having generally the structure of FIG. 1 or an equivalent thereof, or that would benefit from the functions as described herein.)

Database engine 110 may be any form of database and can include, but is not limited to, a device having a processor and memory for executing and storing instructions. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, database engine 110 is a source of transactions that modify data in the replicate database 120.

Replication agent 140 may capture replicated transactions in database engine 110, and then may send those transactions to a replication server 130 for distribution to replicate database 120. Database engine 110 provides transaction and replication related information so that the replication agent 140 can access it.

Figure 2A:
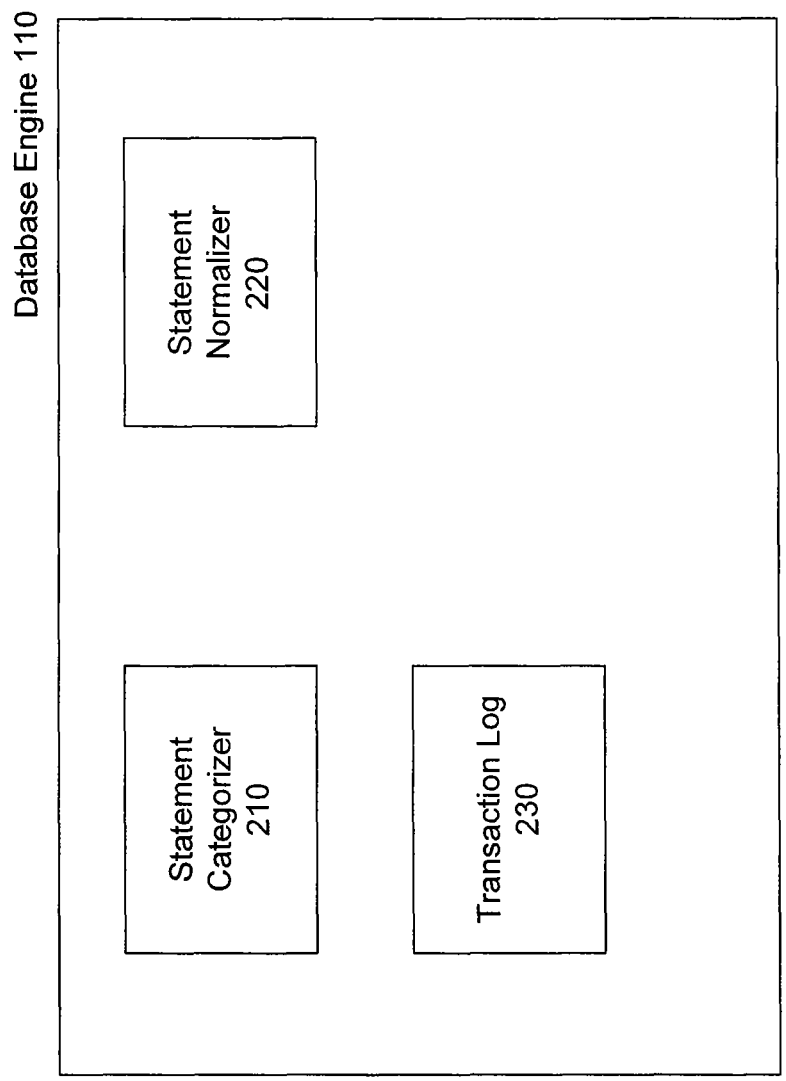
FIG. 2A is a diagram illustrating a database engine, according to an embodiment of the invention.

In an embodiment, replication agent 140 runs as a stand-alone application or a thread running within database engine 110. As shown in FIG. 2A, database engine 110 includes statement categorizer 210, statement normalizer 220 and transaction log 230. When a table in database engine 110 is marked for replication, transactions that change the data in that table are captured for replication. Database engine 110 processes each transaction, and a copy of each transaction (including all its operations) is stored in transaction log 230. The operation of statement categorizer 210, statement normalizer 220 is described further below.

Referring back to FIG. 1, replication server 130 may receive replicated transactions from replication agent 140. In an embodiment, replication server 130 may send replicated transactions to replicate database 120 in response to one or more commands received from replication agent 140. As an example, when the replicated transaction is processed successfully by replicate database 120, the replicate database 120 is synchronized with data in database engine 110. An embodiment of the replication server 130 is the Sybase Replication Server® which is well known and described in publicly available documents, such as the "Sybase Replication Server® 15.0.1 Reference Manual" published in September 2007, which is herein incorporated by reference in its entirety.

Network 102 can be any type of network or combination of networks such as, but not limited to, a local area network, wide area network or the Internet. Network 102 may be any form of a wired network or a wireless network, or a combination thereof. Network 102 may allow database engine 110, replication server 130, replication agent 140 and replicate database 120 to communicate with each other.

Figure 2B:
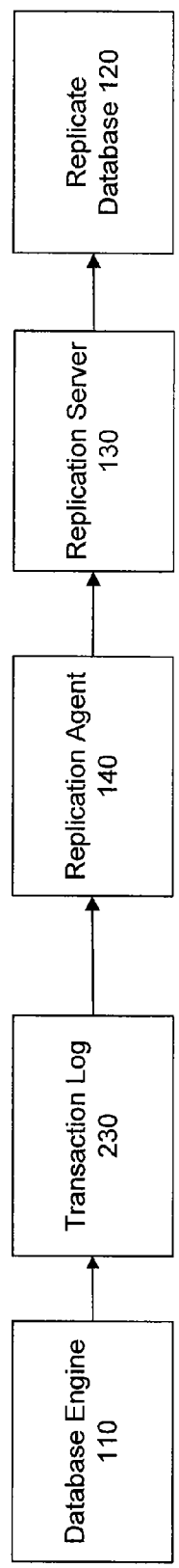
FIG. 2B is a flow diagram illustrating exemplary data flow that occurs in the system described in FIG. 1, according to an embodiment of the invention.

FIG. 2B is a flow diagram illustrating an exemplary data flow between database engine 110, transaction log 230, replication agent 140, replication server 130 and replicate database 120.

Referring to FIG. 2B, when a table in database engine 110 is marked for replication, transactions that change the data in that table are captured for replication. Database engine 110 processes each transaction, and atomic row changes are stored in transaction log 230. Replication agent 140 may then read transactions from transaction log 230, and then may send transactions to be replicated to replication server 130 for distribution to replicate database 120.

In this way, replication related data and other data may be communicated within system 100.

In an embodiment, a warm standby replication environment is used to enable replication in a set of databases. In the warm standby replication environment, replicate database 120 is an identical copy of database engine 110. As an example, if the database engine 110 fails, the application can switch to a replicate database 120 and resume operations with negligible interruption.

In a warm standby replication environment, modifications that may be done in primary tables of database engine 110 are forwarded to replication server 130 by replication agent 140. Tables in database engine 110 are replicated, and the content and schema of replicate database 120 may be identical in the database engine 110 and the replicate database 120. As data and schema are identical in database engine 110 and replicate database 120, statement replication may affect the same dataset in both databases without any need from replication server 130 to add logic before replicating the statement.

Figure 3:
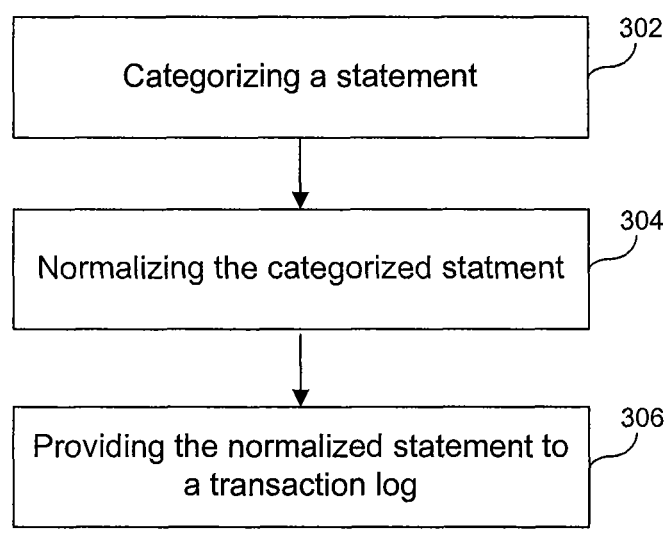
FIG. 3 is a flowchart illustrating the operation of the system described in FIG. 1, according to an embodiment of the invention.

The operation of system 100, according to an embodiment of the invention, will now be described with reference to flowchart 300 in FIG. 3.

In step 302, a statement is categorized by statement categorizer 210 in database engine 110. For example, a SQL statement may be categorized by statement categorizer 210.

In step 304, a categorized statement is normalized by statement normalizer 210 in database engine 110.

In step 306, the normalized statement is provided to transaction log 230.

Statement categorization and normalization will eliminate inconsistencies that may arise between database engine 110 and replicate database 120. Statement categorization and normalization are described below.

2. Statement Categorization

Statement categorization is a process that includes verification of a DML statement and its assignment to a certain category, so that it helps a replication server identify replicated databases on which a query can be executed without causing data inconsistency. In replication configurations where only a subset of data is replicated, or the object's schema is different on the primary database and replicate database, when user 104 executes a data manipulation language (DML) statement using a join with another table in database engine 110, it may difficult to ensure the same set of data will ultimately reside in the database engine 110 and replicate database 120. The table used for the join may or may not be marked for replication, and even if marked, values on the replicate database 120 may be partial or different than in database engine 110. For example, INSERT t1 SELECT a, b, c FROM t1, t2 WHERE t1.pk=t2.pk Furthermore, many other situations may exist where statement replication using conventional approaches may result in inconsistency between database engine 110 and replicate database 120.

As stated earlier, statement categorization is a process that includes verification of a DML statement and its assignment to a certain category, so that it helps the replication server identify replicated databases on which a query can be executed without causing data inconsistency. A category is a class of DML statements having common properties with respect to a replication process. The number of categories defined by this process depends on the number of classes of the replication targets.

Based on statement properties statement categorizer 210 may identify a SQL DML category for each statement. The number of categories depends on characteristics of the replication target sites or replicate database 120.

In an embodiment, different categories of DML statements are defined, including but not limited to:

1. Statements which can be replicated on any of replicated sites or replicate database 120, including warm standby configured sites.
2. Statement which can be replicated only on warm standby configured sites, and
3. Statements which may not be replicated at all in a replication environment.

The process of assigning a statement to some category is called statement categorization and is based on DML semantics (SQL statement properties). Although the following is described in terms of three categories (categories C1, C2 and C3), it is to be appreciated that the invention is not limited to this embodiment and statements may be categorized into a different number of categories.

2.1 Statement Category C3:

DML statements which may not replicated at all using DML replication (Category C3 statements) are those that satisfy at least one of the following conditions:

1. Statements that refer to views, temporary tables or tables located in other databases.
2. Statements that have been executed with 'set rowcount' option set to a value greater than zero.
3. Statements that use a TOP directive, or a Java or SQL UDF function.
4. Statements where a base table has encrypted columns and a statement makes reference to an encrypted column on a set or where clauses
5. Statements which use built-in functions such as rand( ), or other system built-in functions such as textptr( ), tsqual( ), object_id( ) that could not be normalized. Statement normalization is described further below
6. Statements that include references to global variables that could not be normalized. For example in the predicates, if a "SELECT INTO" statement uses system global variables in the SELECT, data may be different in the replicate database 120 and may result in inconsistency between database engine 110 and replicate database 120.
7. Statements that reference system catalog tables.
8. "INSERT" statements that generate a new identity or timestamp values.
9. "UPDATE" statements that change a timestamp or identity value.
10. "UPDATE" statements that include a local variable assignment. For example:
    UPDATE t set @a=@a+2, c=@a WHERE . . .
11. Statements that make a reference to materialized computed columns.
12. "SELECT INTO" statements that allow a user to encrypt a target column where the source column is not encrypted.
13. "SELECT" statements, on "INSERT SELECT" or "SELECT INTO", that use "UNION" clauses.

These conditions are exemplary and are not intended to limit the invention.

2.2 Statement Category C1

If a DML statement does not fall into a 'non-replicable category' or category C3, it may be categorized as category C1.

In an embodiment, statement categorizer 210 categorizes a statement that can be potentially replicated on replicate database 120 as category C1 if it meets all of the following conditions:

1. The statement makes use of a single table, thereby avoiding dependency on other objects.
2. The statement includes only "DELETE" and/or "UPDATE" statements.
3. The statement query syntax is ANSI compliant and the statement may be executed on ANSI compliant relational database management systems,
4. The statement query uses built-in functions whose results can be flattened or normalized. For example, the statement:
    convert(int, '3') may be flattened to "3" because not all databases support the convert( ) function. Statement normalization is described further below.
5. The statement does not reference identity or timestamp columns.
6. The expression evaluated in the statement produces a deterministic result set.

2.3 Statement Category C2

If a DML statement that can be replicated (i.e. it cannot be categorized as category C3) does not qualify to be categorized as category C1, it is categorized as a category C2 statement.

Statements from category C2 are those which can be replicated in a warm standby replication configuration. As described earlier, in a warm standby replication environment, replicate database 120 is an identical copy of database engine 110. As an example, not intended to limit the invention, warm standby configurations allow conditions for a DML statement to be categorized as a category C1 statement to be relaxed, since in a warm standby configuration the target database provides the same environment for the execution of DML statements as the primary database where DML is executed.

In an embodiment, statement categorizer 210 categorizes a statement as category C2 if the statement meets all of the following conditions:

1. The statement can include queries of category C1.
2. The statement can reference multiple tables in the same database.
3. The statement can comprise "SELECT INTO" or "INSERT SELECT" commands that have not been categorized as category C3.
4. The statement query syntax can include Transact SQL extensions, such as outer joins and aggregations.
5. The statement can reference a timestamp and/or identity columns.
6. The statement uses built-in functions that do not evaluate to constants, such as:

UPDATE t set col=1 where substring (col2, 1, 1)='A'

Figure 4:
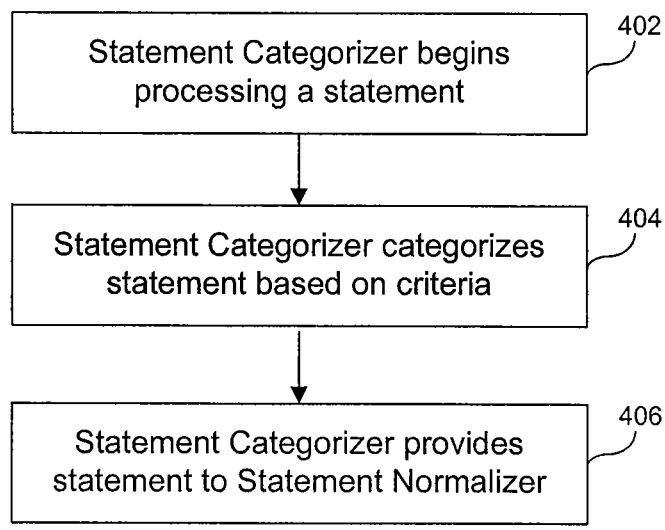
FIG. 4 is a flowchart illustrating the operation of a statement categorizer, according to an embodiment of the invention.

The operation of statement categorizer 210 according to an embodiment of the invention will now be described with reference to flowchart 400 in FIG. 4.

In step 402, statement categorizer 210 begins processing a statement. As an example, statement categorizer 210 may begin processing a SQL statement.

In step 404, statement categorizer 210 categorizes the SQL statement based on one or more criteria, such as those described above. As an example, statement categorizer may categorize the statement as category C1 if it makes use of a single table, thereby avoiding a dependency with other objects.

In step 406, statement categorizer 210 provides the categorized statement to statement normalizer 220.

In this way, statement categorizer 210 categorizes statements which are provided to statement normalizer 220. Statement normalization, and the operation of statement normalizer 220, is described in the next section.

3. Statement Normalization

In an embodiment, statement normalizer 220 in database engine 140 (as shown in FIG. 2A) normalizes a statement before it is provided to replication agent 130. As an example, a statement may be normalized by statement normalizer 220 to convert any expressions that occur in the statement to their respective results. Furthermore, if a query includes variables, statement normalizer 220 may convert references to such variables to references to values of the variables.

In another embodiment, statement normalizer 220 may divide a single SQL statement into multiple parts prior to make it available to replication agent.

Accordingly, replication server 130 receives and processes statements that have been normalized by statement normalizer 220. A normalized form of a query or statement may help replication server 130 regenerate a statement to be executed on replicate database 120, so as to eliminate any inconsistencies that the query may cause if it is applied directly to the replicated database 120.

In an embodiment, statement normalization consists of at least two distinct stages.

During a first stage, a DML statement's text is changed by statement normalizer 220 so that:

1. Constant expression results are substituted by their runtime evaluation values
2. SQL variable and parameters are substituted by their runtime values
3. INSERT clause will changed to reflect presence of the default values for columns not present in the original INSERT DML statement
4. Database names are removed from the DML text
5. SQL extensions like FOR BROWSE, optimizer hints, abstract plan directives are removed from the DML text.

These examples are illustrative and are not intended to limit the invention. In general terms, for example, normalization includes converting a statement, such as a SQL DML statement, into a form that is repeatable, replicable and easily understood by a replication server.

During a second stage, a DML statement's text is split into multiple sections, each section representing a part of the original DML statement. Exemplary sections are illustrated in Table 1 below:

TABLE 1

| Parameter | Exemplary Purpose |
| --- | --- |
| operator | Can be set to UPDATE, DELETE, INSERT SELECT, SELECT INTO to indicate the nature of the statement. |
| object | Used to indicate a table name. |
| owner | Used to indicate an owner name. |
| set | Used to indicate a "SET" clause in an UPDATE statement. |
| where | Used to indicate a "WHERE" clause in a statement. |
| select | Used to indicate "SELECT" clause in a SELECT INTO or INSERT SELECT statement. |
| from | Used to indicate a "FROM" clause in a SELECT INTO or INSERT SELECT statement. |
| column | Used to indicate a column list in an INSERT SELECT statement. |
| category | Provides the information about DML categorization |

4. Exemplary Normalized Statements

This section describes exemplary methods of normalization, and exemplary statements that may be normalized by statement normalizer 220, according to an embodiment of the invention. Other statements that can be normalized will be apparent to persons skilled in the art based on the techniques provided herein.

4.1 Normalizing by Removal of References to a Database Name

In an embodiment, statement normalizer 220 may remove a reference database name that is associated with a table.

Consider the exemplary statement:

DELETE dbname.owner.t1 where col>10

Statement normalizer 220 may normalize the above statement to:

Operator='DELETE'
Object='t1'
Owner='owner'
Where='col>10'

Accordingly, in the above statement, statement normalizer 220 has removed the reference to database "dbname" and split the statement into several sections. Such a normalized statement is provided to replication server 130 for processing.

4.2 Normalizing by Appending Table Owner Information

Statement normalizer 220 may append table owner information within a statement based on replication specific settings.

Consider the exemplary statement:

UPDATE t1 set a=5 where c=1

Statement normalizer 220 may normalize the above statement to:

Operator='UPDATE'
Owner='owner'
Object='t1'
Set='a=5'
Where ='c=1'

4.3 Normalizing by Evaluating Variables and Parameters to Constants

Statement normalizer 220 may evaluate variables and parameters to result constants.

Consider the exemplary statement:

UPDATE t1 set a=@a

Statement normalizer 220 may normalize the above statement to:

Operator='UPDATE'
Object='t1'
Set='a="ABC"'

4.4 Normalizing by Converting Expressions to Results

Statement normalizer 220 may evaluate expressions and other built-in functions to results.

Consider the exemplary statements:

UPDATE t1 set datecol=getdate( )
UPDATE t1 set c=2+3

Statement normalizer 220 may normalize the above statements to:

Operator='UPDATE'
Owner='owner'
Object='t1'
Set='datecol="10/22/2008"'
Operator='UPDATE'
Owner='owner'
Object='t1'
Set='c=5'

4.5 Normalizing by Substituting Default Values

Statement normalizer 220 may substitute default values that appear with statements, Consider an exemplary statement where table "t2" is defined as (a,b,c) and has a default value of 5 for column a:

INSERT t2 (b, c) SELECT t b, c from t3

Statement normalizer 220 may normalize the statement to:

Operator-INSERT
Owner=owner
Object=t2
Select=SELECT 5,b,c from t3

Other normalization operations will be apparent to persons skilled in the relevant arts. For example statement normalizer 220 may remove query hints and abstract plan syntax that may appear in a statement. Also, table aliases, directives such as "FOR BROWSE" and isolation level directives may also be removed by statement normalizer 220.

Figure 5:
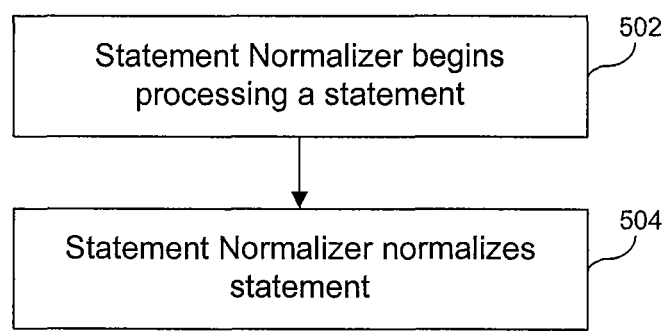
FIG. 5 is a flowchart illustrating the operation of a statement normalizer, according to an embodiment of the invention.

An exemplary operation of statement normalizer 220 according to an embodiment of the invention will now be described with reference to flowchart 500 in FIG. 5.

In step 502, statement normalizer 220 begins processing a statement. As an example, statement normalizer 220 may begin processing a SQL statement that was categorized by statement categorizer 210.

In step 504, statement normalizer 220 normalizes the statement. As an example, statement normalizer 220 may normalize the statement by converting statement expressions to results. Other normalization methods are described above.

5. Example Computer Embodiment

Figure 6:
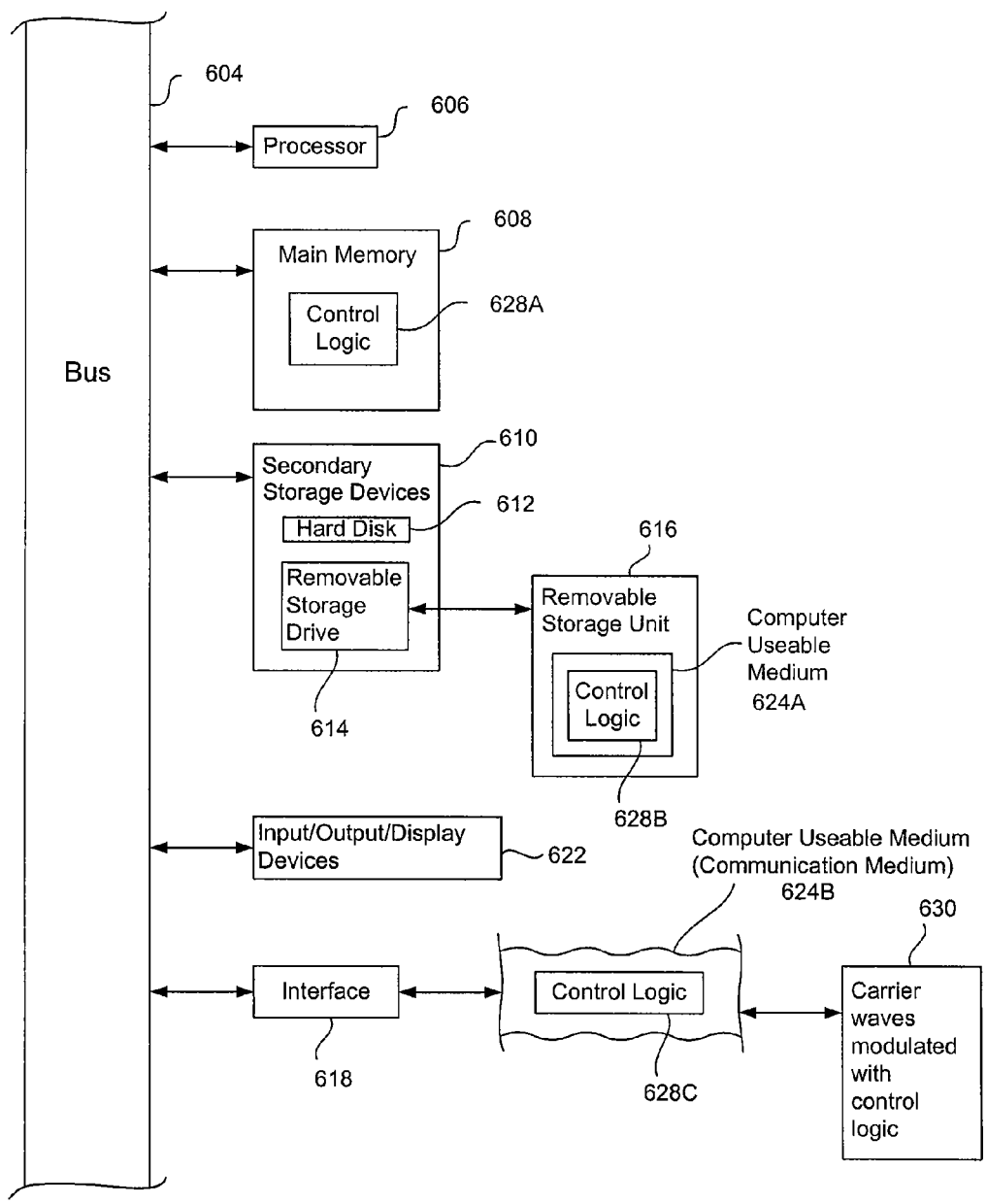
FIG. 6 illustrates an example computer useful for implementing components of embodiments of the invention.

In an embodiment of the present invention, the system and components of embodiments described herein are implemented using well known computers, such as computer 602 shown in FIG. 6. For example, replication agent 140 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 626A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 616. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for replicating a data manipulation language statement comprising:
    categorizing a statement into a replication category, said replication category being defined to include a class of statements having common properties with respect to a replication process, wherein said categorization is configured to be used to determine whether said statement can be executed on one or more of a plurality of databases without causing data inconsistency, wherein categorizing said statement comprises categorizing said statement into a first category if it does not belong to either a second category or a third category, and it meets all of a first plurality of criteria, and wherein said first plurality of criteria comprises all of (1)-(6):
        (1) statements that make use of a single table;
        (2) statements that include only "DELETE" and/or "UPDATE" statements;
        (3) statements whose query syntax is ANSI compliant;
        (4) statements using built-in functions;
        (5) statements that do not reference identity or timestamp columns; and
        (6) statements that include expressions that when evaluated produce a deterministic result set;
    normalizing said categorized statement to generate a normalized statement; and
    logging said normalized statement,
    wherein said categorizing, said normalizing and said logging are performed using one or more processors.

2. The method of claim 1, wherein said categorizing step further comprises:
    categorizing said statement into said second category if it does not belong to said third category, and it meets all of a second plurality of criteria; and
    categorizing said statement into said third category if it meets at least a third plurality of criteria.

3. The method of claim 2, wherein said second plurality of criteria comprises all of (1)-(6):
    (1) statements that can include queries satisfy first criteria;
    (2) statements that can use different tables in the same database;
    (3) statements that can include "SELECT INTO" and "INSERT SELECT" commands;
    (4) statements that can include Transaction SQL extensions;
    (5) statements that can reference timestamp and identity values; and
    (6) statements that can include built-in functions that cannot be evaluated into constants.

4. The method of claim 2, wherein said third plurality of criteria comprises at least one of (1)-(13):
    (1) statements that refer to views, temporary tables or tables located in other databases;
    (2) statements that have been executed with 'set rowcount' option set to a value greater than zero;
    (3) statements that use a TOP directive, or a Java or SQL UDF function;
    (4) statements where a base table has encrypted columns and a statement makes reference to an encrypted column on a set or where clauses;
    (5) statements which use built-in functions that could not be normalized;
    (6) statements that include references to global variables that could not be normalized;
    (7) statements that reference system catalog tables;
    (8) "INSERT" statements that generate a new identity or timestamp values;
    (9) "UPDATE" statements that change a timestamp or identity value;
    (10) "UPDATE" statements that include a local variable assignment;
    (11) Statements that make a reference to materialized computed columns;
    (12) "SELECT INTO" statements that allow a user to encrypt a target column where the source column is not encrypted; and
    (13) "SELECT" statements, on "INSERT SELECT" or "SELECT INTO", that use "UNION" clauses.

5. The method of claim 1, wherein said normalizing step comprises:
converting said statement into a statement that is repeatable at a replicate database; and
converting said statement into a form readable by a replication server.

6. The method of claim 5, wherein said normalizing step comprises at least one of (1)-(5):
(1) removing references to a database name;
(2) appending table owner information;
(3) evaluating variables and parameters to constants;
(4) converting expressions to results; and
(5) substituting default values.

7. The method of claim 1, further comprising:
providing said normalized statement to a replication server.

8. The method of claim 1, wherein said categorizing comprises categorizing said statement into a category of statements comprising:
(1) statements that can be replicated on any of the plurality of databases;
(2) statements that can be replicated only on warm standby configured databases; and
(3) statements that cannot be replicated on any of the plurality of databases.

9. The method of claim 1, wherein said categorization is configured to identify replicated databases on which a query can be executed without causing data inconsistency.

10. The method of claim 1, wherein categorizing the statement comprises verification of the statement.

11. A system for replicating a data manipulation language statement, comprising:
a first module configured to categorize a statement into a replication category, said replication category being defined to include a class of statements having common properties with respect to a replication process, wherein said categorization is configured to be used to determine whether said statement can be executed on one or more of a plurality of databases without causing data inconsistency, wherein said first module is configured to categorize statements based on a first plurality of criteria comprising all of (1)-(6):
(1) statements that make use of a single table;
(2) statements that include only "DELETE" and/or "UPDATE" statements;
(3) statements whose query syntax is ANSI compliant;
(4) statements using built-in functions;
(5) statements that do not reference identity or timestamp columns; and
(6) statements that include expressions that when evaluated produce a deterministic result set;
a second module configured to normalize said categorized statement to generate a normalized statement; and
a third module configured to log said normalized statement,
wherein said first module, said second module and said third module are implemented using one or more processors.

12. The system of claim 11, wherein said first module is further configured to categorize statements based on a second plurality of criteria and a third plurality of criteria.

13. The system of claim 12, wherein said second plurality of criteria comprises all of (1)-(6):
(1) statements that can include queries satisfy first criteria;
(2) statements that can use different tables in the same database;
(3) statements that can include "SELECT INTO" and "INSERT SELECT" commands;
(4) statements that can include Transaction SQL extensions;
(5) statements that can reference timestamp and identity values; and
(6) statements that can include built-in functions that cannot be evaluated into constants.

14. The system of claim 12, wherein said third plurality of criteria comprises at least one of (1)-(13):
(1) statements that refer to views, temporary tables or tables located in other databases;
(2) statements that have been executed with 'set rowcount' option set to a value greater than zero;
(3) statements that use a TOP directive, or a Java or SQL UDF function;
(4) statements where a base table has encrypted columns and a statement makes reference to an encrypted column on a set or where clauses;
(5) statements which use built-in functions that could not be normalized;
(6) statements that include references to global variables that could not be normalized;
(7) statements that reference system catalog tables;
(8) "INSERT" statements that generate a new identity or timestamp values;
(9) "UPDATE" statements that change a timestamp or identity value;
(10) "UPDATE" statements that include a local variable assignment;
(11) Statements that make a reference to materialized computed columns;
(12) "SELECT INTO" statements that allow a user to encrypt a target column where the source column is not encrypted; and
(13) "SELECT" statements, on "INSERT SELECT" or "SELECT INTO", that use "UNION" clauses.

15. A computer program product including a non-transitory computer-readable medium having instructions stored thereon that, if executed by a processing device, cause the processing device to perform operations comprising:
categorizing a statement into a replication category, said replication category being defined to include a class of statements having common properties with respect to a replication process, wherein said categorization is configured to be used to determine whether said statement can be executed on one or more of a plurality of databases without causing data inconsistency, wherein categorizing said statement comprises categorizing said statement into a first category if it does not belong to either a second category or a third category, and it meets all of a first plurality of criteria, and wherein said first plurality of criteria comprises all of (1)-(6):
(1) statements that make use of a single table;
(2) statements that include only "DELETE" and/or "UPDATE" statements;
(3) statements whose query syntax is ANSI compliant;
(4) statements using built-in functions;
(5) statements that do not reference identity or timestamp columns; and
(6) statements that include expressions that when evaluated produce a deterministic result set;
normalizing said categorized statement to generate a normalized statement; and
logging said normalized statement.

16. The computer program product of claim 15, said categorizing further comprising:
- categorizing said statement into said second category if it does not belong to said third category, and it meets all of a second plurality of criteria; and
- categorizing said statement into said third category if it meets at least a third plurality of criteria.

17. The computer program product of claim 15, said normalizing comprising:
- converting said statement into a statement that is repeatable at a replicate database; and
- converting said statement into a form readable by a replication server.

18. The computer program product of claim 15, said normalizing comprising at least one of (1)-(5):
- (1) removing references to a database name;
- (2) appending table owner information;
- (3) evaluating variables and parameters to constants;
- (4) converting expressions to results; and
- (5) substituting default values.

19. The computer program product of claim 15, said operations further comprising:
- providing said normalized statement to a replication server.

* * * * *